US010214358B2

United States Patent
Guerra

(10) Patent No.: US 10,214,358 B2
(45) Date of Patent: Feb. 26, 2019

(54) MULTI-V CONSTANT SPEED ROLLER SHEAVE

(71) Applicant: Lewco, Inc., Sandusky, OH (US)

(72) Inventor: Gerald T. Guerra, Sandusky, OH (US)

(73) Assignee: LEWCO, INC., Sandusky, OH (US)

( * ) Notice: Subject to any disclaimer, the term of this patent is extended or adjusted under 35 U.S.C. 154(b) by 0 days.

(21) Appl. No.: 16/006,307

(22) Filed: Jun. 12, 2018

(65) Prior Publication Data

US 2018/0354722 A1    Dec. 13, 2018

Related U.S. Application Data

(60) Provisional application No. 62/518,041, filed on Jun. 12, 2017.

(51) Int. Cl.
*B65G 13/04* (2006.01)
*B65G 13/07* (2006.01)

(52) U.S. Cl.
CPC .......... *B65G 13/07* (2013.01); *B65G 13/04* (2013.01)

(58) Field of Classification Search
CPC ......... B65G 13/07; B65G 13/04; B65G 13/02
USPC ....................................................... 198/790
See application file for complete search history.

(56) References Cited

U.S. PATENT DOCUMENTS

| 4,341,546 | A | * | 7/1982 | Nitschke | B65G 13/07 198/575 |
| 5,769,204 | A | | 6/1998 | Okada et al. | |
| 6,772,873 | B1 | * | 8/2004 | Coleman | B65G 13/04 198/780 |
| 9,981,804 | B2 | | 5/2018 | Guerra et al. | |
| 2008/0277247 | A1 | * | 11/2008 | Eubanks | B65G 13/07 198/789 |
| 2009/0008218 | A1 | * | 1/2009 | Fourney | B65G 17/24 198/412 |
| 2009/0107809 | A1 | * | 4/2009 | Wagner | B65G 13/04 198/786 |
| 2011/0139589 | A1 | * | 6/2011 | Agnoff | B65G 13/07 198/788 |
| 2011/0155063 | A1 | * | 6/2011 | Little | B65G 13/071 118/729 |
| 2015/0068873 | A1 | * | 3/2015 | Wallace | B65G 13/073 198/790 |

(Continued)

FOREIGN PATENT DOCUMENTS

EP    0327652 A1 *  8/1989 ............ B65G 13/11

*Primary Examiner* — Mark A Deuble
(74) *Attorney, Agent, or Firm* — Shumaker, Loop & Kendrick, LLP; James D. Miller

(57) ABSTRACT

A conveyor system comprising a series of rollers coupled to a side of a frame and configured to convey a plurality of conveyed articles thereacross along a direction of travel. Each of the rollers has a drive end. The series of rollers including a directly driven roller and a plurality of slave driven rollers disposed after the directly driven roller with respect to the direction of travel. The conveyor system includes a plurality of sheaves. Each of the sheaves is coupled to a drive end of one of the rollers. Each of the sheaves includes a plurality of V-shaped grooves formed in an outer surface thereof. The grooves are divided into an inner portion and an outer portion. An outer diameter of the inner portion of each of the sheaves is unequal to an outer diameter of the outer portion of each of the sheaves.

20 Claims, 4 Drawing Sheets

(56) References Cited

U.S. PATENT DOCUMENTS

| | | | |
|---|---|---|---|
| 2015/0183583 A1* | 7/2015 | Specht | B65G 39/12 198/790 |
| 2016/0101943 A1* | 4/2016 | Guerra | B65G 13/07 198/781.03 |
| 2016/0251169 A1* | 9/2016 | Stefanko | B65G 47/261 198/459.8 |

* cited by examiner

MULTI-V CONSTANT SPEED ROLLER SHEAVE

CROSS-REFERENCE TO RELATED APPLICATIONS

This patent application claims the benefit of U.S. Provisional Patent Application No. 62/518,041 filed on Jun. 12, 2017. The entire disclosure of the above patent application is hereby incorporated herein by reference.

FIELD OF INVENTION

The invention relates to conveyor rollers and more particularly to a system and method of maintaining substantially constant surface speed across a series of rollers driven by multi-V torque transmitters.

BACKGROUND

Roller conveyors are commonly employed for material handling to transport products or equipment from one location to another location. The roller conveyors typically consist of a series of tubular rollers. For certain material handling applications, the rollers are driven by a multi-V belt torque transmitting mechanism. The torque transmitting mechanisms typically engage with a hub or sheave of the rollers. In particular, many conveyor manufactures are now making POLY-V® brand multi-V conveyor belt slave driven roller conveyors because of the distinct advantages of high torque capability, low noise, and an ability to reduce the number of drives in many applications.

Typically, a first roller or directly driven roller in the series of rollers is driven by a motor. Consecutive ones of the rollers after the first roller are slave driven by the first one of the rollers through the use of the multi-V belts. For example, a first multi-V belt engages the first roller to an adjacent second roller or slave driven roller in the series of rollers. As a result, the second roller is driven by the first roller. A second multi-V belt engages the second roller and a third roller or slave driven roller. As a result, the third roller is driven by the second roller. The multi-V belts are continually used to engage adjacent ones of the slave driven rollers in the series of rollers from the first roller or directly driven roller to an end roller in the series of rollers. By employing multi-V belts in the above-mentioned configuration, belt tensioners can be eliminated.

The mechanical efficiency of multi-V belts to facilitate maintaining a rotational speed, and thus a conveyor surface speed, from the directly driven roller to the successive slave driven rollers is advantageous in most applications such as pallet handling applications and container or product handling applications. However, in certain sortation applications, such as singulator conveyor systems, the multi-v belts may be inefficient. Singulator conveyor systems are used for alignment and singulation of packages, goods, and materials. An example of a singulator conveyor system is disclosed in U.S. Pat. No. 9,981,804 and U.S. Pat. No. 5,769,204, the disclosures of which are hereby incorporated herein by reference in their entirety. The singulator conveyor systems may be employed in packaging facilities such as courier facilities so packaging can be identified and automatically processed through sorting equipment. The singulator conveyor systems have skewed, or angled rollers to move the packages to one side of the conveyor system, typically along a guard rail or edge guide.

In a singulator conveyor system, it is desired for the products to be aligned in single file with proper spacing between adjacent ones of the products for proper bar code reading, weighing, or diverting into various shipping lanes. However, the rotational speed of the rollers and the surface speed at the rollers varies from the directly driven roller to the end one of the rollers due to slip of the multi-V belts with respect to the rollers due to a slight inefficiency inherent in the multi-V belts. The rotational speed of and the conveyor surface speed at the slave slave driven rollers successively decreases along the series of rollers from the slave driven roller to the end roller. The decrease in the speeds causes the space between adjacent ones of the products to undesirably decrease. Therefore, it is desired for the speeds of the rollers across the series of rollers to be substantially constant to maintain the desired space between the products traveling on the roller conveyor.

In an attempt to maintain constant speeds, additional motors are employed at intervals along the series of rollers to directly drive additional rollers and convert a slave driven roller into a directly driven roller. For example, a motor may be employed at approximately every eighth roller from the previous directly driven roller. Therefore, in a roller conveyor having twenty-four rollers, three motors are required. Additional motors undesirably increase a cost and a complexity of the roller conveyors and maintenance thereof.

Therefore, it would be desirable to provide a system and method of maintaining a substantially constant surface speed across a series of rollers while minimizing a cost and a complexity of the roller conveyor.

SUMMARY OF THE INVENTION

In accordance and attuned with the present invention, a system and method of maintaining a substantially constant surface speed across a series of rollers while minimizing a cost and a complexity of the roller conveyor has surprisingly been discovered.

According to an embodiment of the disclosure, a conveyor system is disclosed. The conveyor system includes a conveyor system including a series of rollers coupled to a side of a frame and configured to convey a plurality of conveyed articles thereacross along a direction of travel. Each of the rollers has a drive end. The series of rollers including a directly driven roller and a plurality of slave driven rollers disposed after the directly driven roller with respect to the direction of travel. The conveyor system includes a plurality of sheaves. Each of the sheaves is coupled to a drive end of one of the rollers. Each of the sheaves includes a plurality of V-shaped grooves formed in an outer surface thereof. The grooves are divided into an inner portion and an outer portion. An outer diameter of the inner portion of each of the sheaves is unequal to an outer diameter of the outer portion of each of the sheaves.

According to another embodiment of the disclosure, a method of maintaining a substantially constant surface speed in a conveyor system is disclosed. The steps comprising the step of providing a series of rollers and a plurality of sheaves. The rollers are coupled to a side of a frame and configured to convey a plurality of conveyed articles thereacross. Each of the sheaves are coupled to a drive end of one of the rollers. Each of the sheaves include a plurality of V-shaped grooves formed in an outer surface thereof. The grooves are configured to receive a torque transmitter. The grooves are divided into a drive portion and a driven portion. The rollers including a directly driven roller driven by a drive assembly and a plurality of slave driven rollers disposed one of upstream and downstream the directly driven roller with respect to a direction of travel of the conveyor system. The method also includes the step of decreasing an outer diameter of each of the sheaves at the driven portion of each of the sheaves from an outer diameter of each of the sheaves at the drive portion of each of sheaves.

According to yet another embodiment of the disclosure, a method of maintaining a substantially constant surface speed in a conveyor system is disclosed. The steps comprising the step of providing a series of rollers and a plurality of sheaves. The rollers are coupled to a side of a frame and configured to convey a plurality of conveyed articles thereacross. Each of the sheaves are coupled to a drive end of one of the rollers. Each of the sheaves include a plurality of V-shaped grooves formed in an outer surface thereof. The grooves are configured to receive a torque transmitter. The grooves are divided into a drive portion and a driven portion. The rollers including a directly driven roller driven by a drive assembly and a plurality of slave driven rollers disposed one of upstream and downstream the directly driven roller with respect to a direction of travel of the conveyor system. The method also includes the step of decreasing an outer diameter of each of the sheaves at the driven portion of each of the sheaves from an outer diameter of each of the sheaves at the drive portion of each of sheaves. The method further includes the step of maintaining a substantially constant surface speed across the series of the rollers.

BRIEF DESCRIPTION OF THE DRAWINGS

The above, as well as other objects and advantages of the invention, will become readily apparent to those skilled in the art from reading the following detailed description of a preferred embodiment of the invention when considered in the light of the accompanying drawings which.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
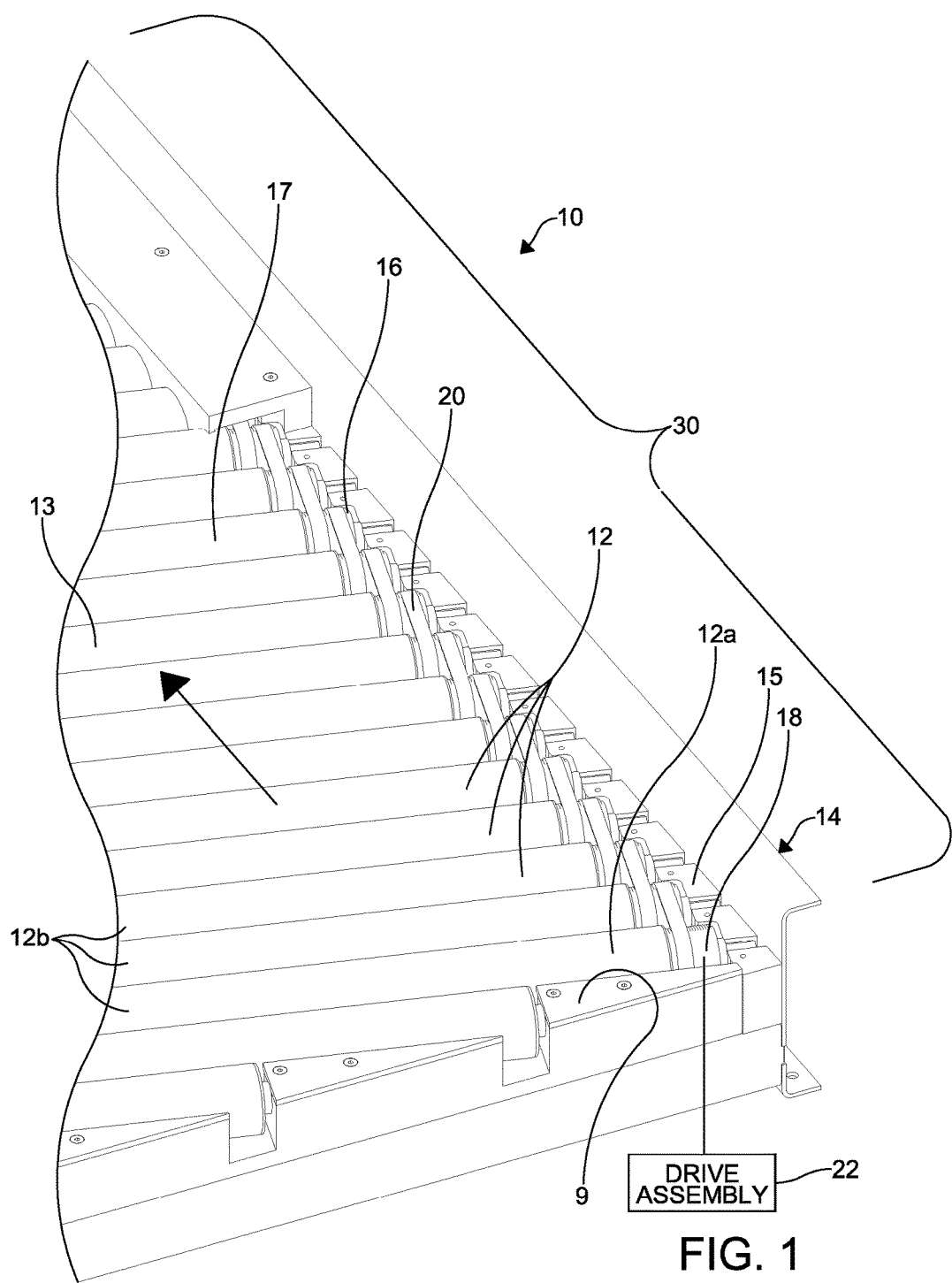
FIG. 1 is a fragmentary top perspective view of a conveyor according to an embodiment of the disclosure, wherein a portion of a conveyor system infeed and a first side of a conveyor system is shown.
Figure 2:
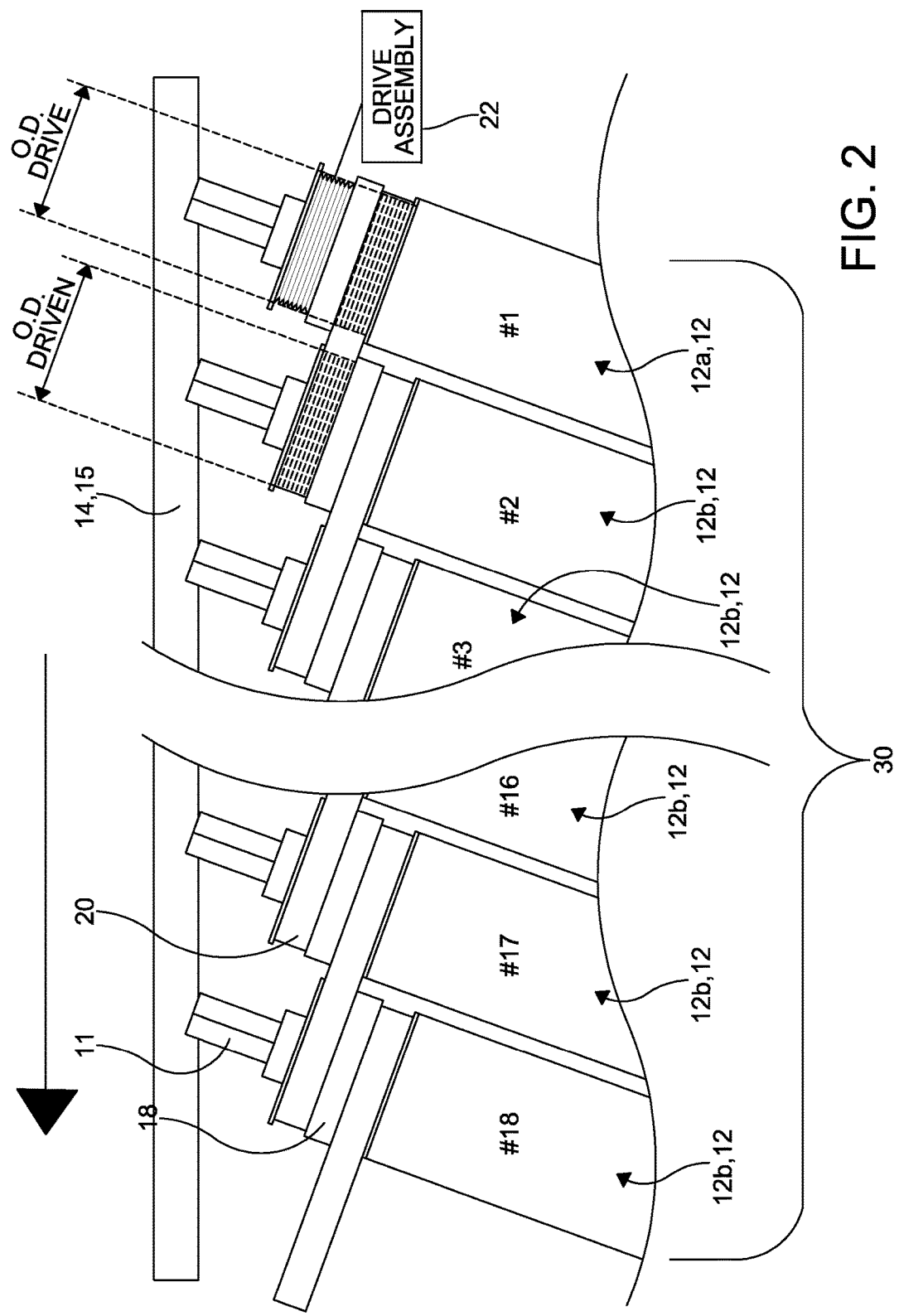
FIG. 2 is a fragmentary top plan view of a series of rollers of the conveyor system of FIG. 1, wherein a middle portion of the series of rollers is removed.

FIGS. 1-2 illustrate a conveyor system 10 employing a plurality of tubular conveyor rollers 12 according to an embodiment of the present disclosure. The rollers 12 are rotatingly mounted at preset intervals within a frame 14. The rollers 12 cooperate with each other to form a bed surface 13 for conveying a material or good (hereinafter "conveyed article") such as a package or product, for example, in a direction of travel, along the conveyor system 10 as indicated by the solid arrow. As used herein, the term "direction of travel" is a path taken by the conveyed articles along a length or curvature of the conveyor assembly 10 from a conveyor system infeed 9 to a conveyor system outfeed (not shown).

A drive end 16 of each of the rollers 12 is mounted to a side 15 of the frame 14 and an opposing base end (not shown) is mounted to an opposing side (not shown) of the frame 14. Each of the rollers 12 includes a tube portion 17 and a drive sheave 18 mounted to the tube portion 17 at the drive end 16 thereof. A shaft 11 extends outwardly from the drive end 16 of each of the rollers 12 and engages the frame 14. The base end of each of the rollers 12 is mounted to the opposing side by a bearing hub (not shown). Although, it is understood, the base end can also include a drive sheave if desired.

The conveyor system 10 can be any conveyor system used with rollers configured to convey materials or goods. For example, as shown in FIG. 1, the conveyor system 10 is configured as a live roller conveyor wherein a drive assembly 22 (schematically shown) is in mechanical communication with one of the rollers 12 to provide torque automatically to the rollers 12. The drive assembly 22 is configured as a conveyor drive assembly and can include a motor, a speed reducer, a drive pulley, sprockets, guards, and other components commonly employed with the conveyor drive assembly such as a drive shaft, for example. It is understood any number of the rollers 12 can be employed as desired.

The conveyor system 10 is configured as a singulation type conveyor. As described herein, a singulation type conveyor refers to a conveyor configured to receive randomly oriented and positioned ones of the conveyed articles in a desired configuration or pattern such as single file along the direction of travel. By positioning and orienting the conveyed articles, the conveyed articles can be conveyed to another conveyor system or other assembly line system or facility one at a time, for example. In other examples, the conveyed articles conveyed in a single file can be more efficiently scanned, tagged, tracked, observed, for quality, or otherwise manipulated or observed. In order to orient and align the conveyed articles into a single file, at least some of the rollers 12 are skewed, or disposed at an angle other than 90 degrees, with respect to the direction of travel or with respect to the side 15 of the frame 14. The skewed rollers 12 cause the conveyed articles to move towards the drive end 16, which is a trailing end of the rollers 12. It is understood, it other embodiments the conveyor system 10 can be configured to orient the rollers 12 substantially normal to side 15 of the frame 14 (See FIG. 3). In such an example the conveyed articles may not necessarily be conveyed in a single file.

Additionally, as shown the conveyor system 10 illustrates parallel ones of the rollers 12. However, it is understood, the conveyor system 10 can include non-parallel rollers to form curved portions of the conveyor system 10. The conveyor system 10 can be configured to cooperate with other conveyor beds and types depending on the application, if desired.

As more clearly shown in FIG. 2, the rollers 12 form a series 30 of the rollers 12. As used herein, the series 30 of the rollers 12 refers to the group of the rollers 12 including a leading roller or a directly driven roller 12a directly driven by the drive assembly 22 and all the respective following slave driven rollers 12b indirectly driven by the same drive assembly 22 driving the directly driven roller 12a. In the embodiment illustrated, the slave driven rollers 12a follow the directly driven roller 12a or are disposed downstream from the directly driven roller 12a with respect to the direction of travel. However, it is understood, the slave driven rollers 12a can also be preceding the directly driven roller 12a or disposed upstream from the directly driven roller 12a. Each of the rollers 12 are either directly driven or indirectly slave driven by the drive assembly 22. The drive assembly 22 causes the directly driven roller 12a to rotate. For example, a drive belt (not shown) of the drive assembly 22 engages the directly driven roller 12a at a portion of the tube portion 17 of the directly driven roller 12a. However, it is understood, the drive belt of the drive assembly 22 may engage the sheave 18 of the directly driven roller 12a to cause the directly driven roller 12a to rotate. It is understood other system and method of rotating the directly driven roller 12a can be contemplated without departing from the scope of the disclosure.

The sheave 18 of each of the rollers is configured to engage with torque transmitters 20 configured as multi-V conveyor belts such as POLY-V® brand multi-V conveyor belts in the embodiment shown. The sheave 18 includes a plurality of V-shaped grooves 24 formed therein. The torque transmitters 20 include a plurality of V-shaped protuberances (not shown) formed on an inner surface thereof to engage the V-shaped grooves 24 of the sheaves 18. Each of the torque transmitters 20 engages a pair of the rollers 12 to transmit torque from a first one of the pair of rollers 12 to a second one of the pair of rollers 12. The directly driven roller 12a is directly driven by the drive assembly 22 but includes one of the torque transmitters 20 to mechanically couple the directly driven roller 12a to an adjacent one of the slave driven rollers 12b. As used herein, slave driven rollers 12b refer to the rollers 12 successively oriented away from the directly driven roller 12a with respect to the direction of travel, either upstream or downstream from the directly driven roller 12a. Due to the torque transmitters 20, torque is transmitted successively from the directly driven roller 12a to the slave driven rollers 12b.

Figure 4:
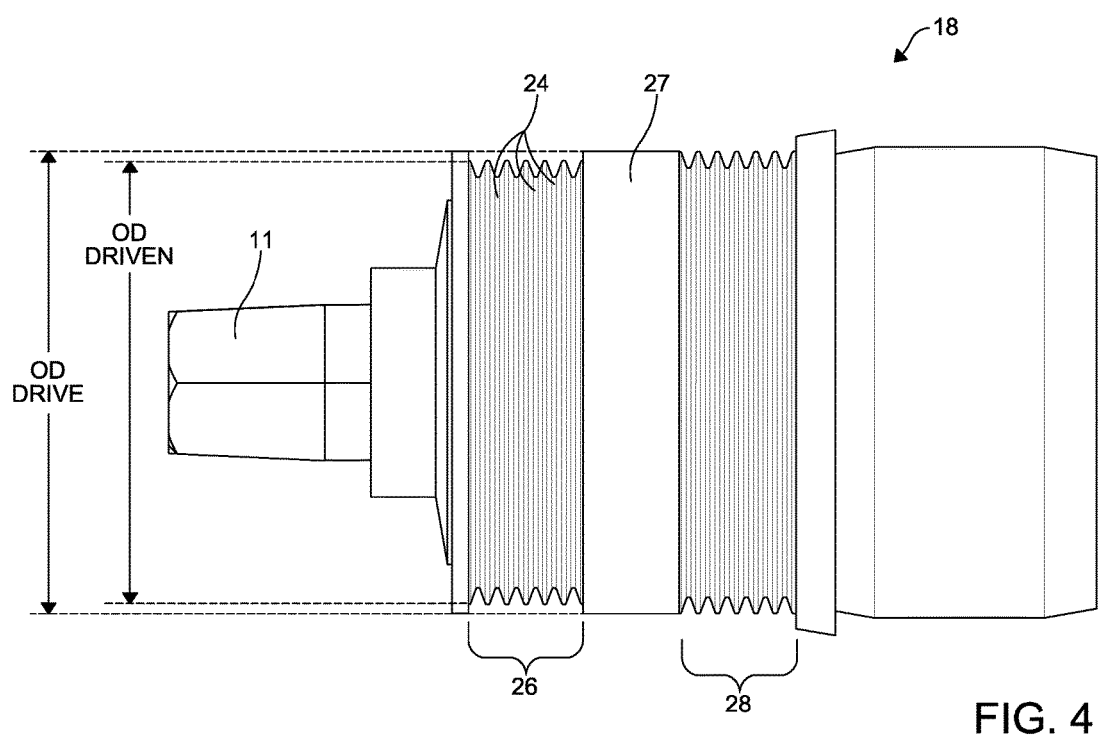
FIG. 4 is a top plan view of a drive sheave of a roller of the conveyor system of FIGS. 1-3.

FIG. 4 illustrates a sheave 18 of each of the conveyors 12. As shown, the sheave 18 includes the V-shaped grooves 24 formed on an outer surface thereof. A bearing assembly (not shown) is received within the sheave 18 to cause the roller 12 to rotate. The shaft 11 extends outwardly from the end 16 of the rollers 12 and the bearing assembly. The V-shaped grooves 24 are divided into an outer portion 26 and an inner portion 28 by a partition 27. The outer portion 26 of the grooves 24 of the slave driven rollers 12b receive one of the torque transmitters 20 engaging a preceding one of the rollers 12 with respect to the direction of travel of the conveyor system 10. The inner portion 28 of the grooves 24 of the directly driven roller 12a and the slave driven rollers 12b receives a following one of the rollers 12 with respect to the direction of travel of the conveyor system 10. The outer portion 26 of the grooves 24 of the directly driven roller 12a receives the belt from the drive assembly 22. In the embodiment illustrated, the outer portion 26 of the grooves 24 is configured as driven portion and the inner portion 28 of the grooves 24 is configured as a drive portion. As used herein, the drive portion refers to a portion of the sheave 18 engaging an upstream portion of the torque transmitter 20 with respect to a direction of travel where the slave driven rollers 12b are disposed downstream from the directly driven roller 12a. The drive portion also refers to a portion of the sheave 18 engaging a down stream portion of the torque transmitter 20 with respect to a direction of travel where the slave driven rollers 12b are disposed upstream from the directly driven roller 12a. As used herein, the driven portion refers to a portion of the sheave 18 engaging a downstream end of the torque transmitter 20 with respect to the direction of travel where the slave driven rollers 12b are disposed downstream from the directly driven roller 12a. The driven portion can also refer to a portion of the sheave 18 engaging and upstream end of the torque transmitter 20 with respect to the direction of travel where the slave driven rollers 12b are disposed upstream from the directly driven roller 12b. The sheave 18 of FIG. 4 is configured as one of the sheaves 18 of the slave driven rollers 12b disposed downstream from the directly driven roller 12a. An outer diameter $OD_{Driven}$ of the outer portion 26 (or driven portion) is less than an outer diameter $OD_{Drive}$ of the inner portion 28 (or drive portion). In embodiments where the sheave 18 is disposed upstream from the directly driven roller 12a, the outer diameter $OD_{Driven}$ of the inner portion 28 (or driven portion) is less than an outer diameter $OD_{Drive}$ of the outer portion 26 (or drive portion).

The series 30 of the rollers 12, in FIG. 2, is positioned at an angle with respect to the direction of travel and the side 15 of the frame 14. The drive end 16 of each of the rollers 12 is offset from the drive end 16 of an adjacent one of the rollers 12. In the embodiment shown, the rollers 12 in the series 30 are numbered one (1) through eighteen (18), wherein the directly driven roller 12a is numbered 1 and the slave driven roller 12b furthest from the directly driven roller 12a is numbered 18. As used herein, there are eighteen of the rollers 12 in the series 30, shown for exemplary purposes, disposed downstream from the directly driven roller 12a. It is understood more than or fewer than eighteen of the rollers 12 can be included depending on the application or operation of the conveyor system 10 and the rollers 12 can be disposed upstream from the directly driven roller 12a. An outer diameter OD of each of sheaves 18 of each of the rollers 12 in the series 30 of the rollers 12 decrease from the outer diameter $OD_{Drive}$ of the drive portion of the sheave 18 to the outer diameter $OD_{Driven}$ of the drive portion of the sheave 18 of the driven portion of the sheave 18.

A difference Δ, measured in inches, between the outer diameter $OD_{Drive}$ of the drive portion of the sheave 18 and the outer diameter $OD_{Driven}$ of the driven portion of the sheave 18 can be determined with the following formula:

$$\Delta = OD_{Drive} - \left[ \left[ \frac{S_{Drive} - \left(\frac{S_{Drive} - S_{Driven}}{N}\right)}{S_{Drive}} \right] * OD_{Drive} \right]$$

According to the above formula, $OD_{Drive}$ is the outer diameter OD of the drive portion of the sheaves 18 measured in inches or, prior to decreasing the outer diameters of the sheaves 18 at the grooves, the outer diameter of an entirety of the sheave 18 at the grooves 24 of the directly driven roller 12a. As shown in FIG. 4, the drive portion is the inner portion. $S_{Drive}$ is a measured or determined surface speed of the directly driven roller 12a measured in feet per minute (FPM). The surface speed $S_{Drive}$ of the directly driven roller 12a is determined measured per application on on-site, model or prototype conveyor systems prior to decreasing the outer diameters of the outer portion 26 or inner portion 28 of the sheaves 18. $S_{Driven}$ is a measured or determined surface speed of the eighteenth (18) slave driven roller 12b before decreasing the outer diameters of the outer portion 26 or inner portion 28 of the sheaves 18, wherein the entirety of the outer diameter of the sheave 18 of the eighteen slave driven roller 12b at the grooves 24 is substantially the same and equal to the outer diameter of the sheave 18 of the directly driven roller 12a. The surface speed of the eighteenth (18) slave driven roller 12b is determined measured per application on on-site, model or prototype conveyor systems. The surface speed $S_{Driven}$ of the eighteenth slave driven roller 12b is measured in feet per minute (FPM). N is the number of the rollers 12 in the series 30 of the rollers 12. It is understood, when measuring or determining the surface speeds $S_{Drive}$, $S_{Driven}$, other variables and parameters may contribute to the difference in the surface speeds $S_{Drive}$, $S_{Driven}$ depending on the application such as frictional forces, slip of belts, loads applied to the rollers 12, an other similar parameters.

As an example, in FIG. 2, the number of the rollers 12 is eighteen (18), the outer diameter $OD_{Drive}$ of the directly driven roller 12a or the drive portion of the sheaves 18 is 2.220 inches, the surface speed $S_{Drive}$ of the directly driven roller 12a is measured to be 569.7 FPM and the surface speed $S_{Driven}$ is measured to be 539.3 FPM. Therefore, the known variables can be inserted into the equation as follows:

$$\Delta = 2.220 - \left[\left[\frac{569.7 - \left(\frac{569.7 - 539.3}{18}\right)}{569.7}\right] * 2.220\right],$$

Δ=0.007 inches.

Accordingly, the difference Δ between the outer diameter $OD_{Drive}$ of the drive portion of the sheave 18 and the outer diameter $OD_{Driven}$ of the driven portion of the sheave 18 is determined to be 0.007 inches. In the example given hereinabove, the outer diameter $OD_{Drive}$ of the drive portion of the sheave 18, or of the grooves 24 of the sheaves 18 prior to decreasing outer diameters, is 2.220 inches. Therefore, the driven portion of each of the sheaves 18 of the rollers 12 in the series 30 of the rollers 12 is 2.213 inches.

It is understood any number of the rollers 12 can be included in the conveyor system 10 such as more than or fewer than eighteen. Additionally, the measured surface speeds $S_{Drive}$, $S_{Driven}$ can be any surface speeds as measured or determined and the outer diameter $OD_{Drive}$ of the drive portion of the sheaves 18 can be any diameter as desired depending on the application of the conveyor system 10.

Figure 3:
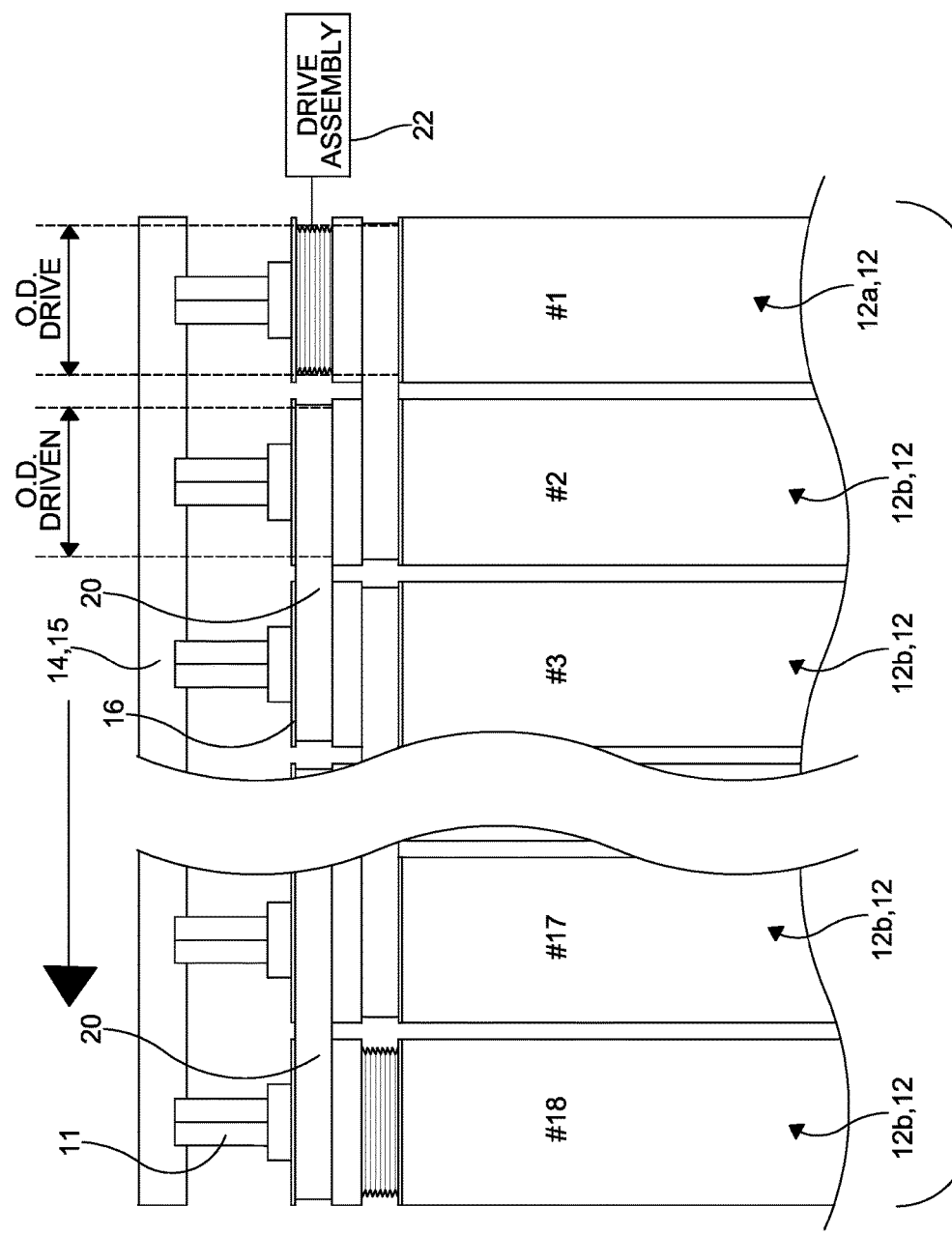
FIG. 3 is a fragmentary top plan view of a series of rollers of a conveyor system according to another embodiment of the disclosure, wherein a middle portion of the series of conveyors is removed.

FIG. 3 illustrates a series 30 of the rollers 12 according to another embodiment of the disclosure. The same reference numerals used to describe the features of the series 30 of the rollers 12 of FIG. 2 are used to describe the features of the series 30 of the rollers 12 of FIG. 2 for convenience. The series 30 of the rollers 12 is substantially similar to the series 30 of the rollers 12 of FIG. 3 except the series 30 of the rollers 12 is disposed substantially perpendicular to the frame 14 and the direction of travel. The outer diameter $OD_{Driven}$ of the driven portion of the sheaves 18 of the rollers 12 decrease from the outer diameter $OD_{Drive}$ of the drive portion of each of the sheaves 18 using the same formula used to determine the difference Δ between the outer diameter $OD_{Drive}$ of the drive portion of the sheave 18 and the outer diameter $OD_{Driven}$ of the driven portion of the sheave 18.

Advantageously, the conveyor system 10 according to the present disclosure maintains a constant surface speed across the conveyor system 10 and the series 30 of the rollers 12. The conveyor system 10 also minimizes complexity and cost of assembly and maintenance. By minimally decreasing the outer diameter of the sheaves 18 from the drive portion to the driven portion, the number of the rollers 12 per the series 30 of the rollers 12 can be increased from the number of the rollers 12 per the series 30 of the rollers 12 of prior art. For example, in known systems, only eight (8) rollers could be directly driven or slave driven before a decrease in surface speed becomes disadvantageous. Therefore, in known systems, a drive assembly is required for every eight rollers. According to the present disclosure, the number of the rollers 12 in the series 30 of the rollers 12 can be significantly increased and the number of the drive assemblies 22 can be minimized. As a result, assembly and maintenance costs are minimized. Additionally, a complexity of the system is minimized. Furthermore, because the decrease in the outer diameters OD is minimal, the same size torque transmitter 20 can be employed along the series 30 of the rollers 12.

In the example given with respect to FIG. 2, there are eighteen (18) of the rollers 12 in the series 30 of the rollers 12. In known systems, three (3) of the drive assemblies 22 would be required to maintain a substantially constant surface speed across the length of the series 30 of the rollers 12 where there are eighteen (18) of the rollers 12 in the series 30 of the rollers 12. However, in the instant disclosure, a substantially constant surface speed can be maintained across the length of the series 30 of the conveyors 12 with only the one drive assembly 22. It is especially advantageous to maintain a substantially constant surface speed across the length of the series 30 of the conveyors 12 for singulation conveyor systems wherein a space between the conveyed articles is critical. As used herein "substantially" with respect to the constant surface speed of the rollers 12 is defined as "to a considerable degree" or "proximate" or as otherwise understood by one ordinarily skilled in the art. For example, "substantially constant surface speed" means the surface speed of the rollers 12 across the series 30 of the rollers 12 differs from the surface speed $S_{Drive}$ of the directly driven roller 12a by a range of 0-10 percent of the surface speed $S_{Drive}$ of the directly driven roller 12a. More specifically, the surface speed of the rollers 12 across the series 30 of the rollers 12 differs from the surface speed $S_{Drive}$ of the directly driven roller 12a by a range of 0-3 percent of the surface speed $S_{Drive}$ of the directly driven roller 12a. Even more specifically, the surface speed of the rollers 12 across the series 30 of the rollers 12 differs from the surface speed $S_{Drive}$ of the directly driven roller 12a by a range of 0-1 percent of the surface speed $S_{Drive}$ of the directly driven roller 12a.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A conveyor system comprising:
   a series of rollers coupled to a side of a frame and configured to convey a plurality of conveyed articles thereacross along a direction of travel, each of the rollers having a drive end, the series of rollers including a directly driven roller driven by a drive assembly of the conveyor system and a plurality of slave driven rollers indirectly driven by the drive assembly by torque transmitters; and
   a plurality of sheaves, each of the sheaves coupled to a drive end of one of the rollers, each of the sheaves including a plurality of V-shaped grooves formed in an outer surface thereof, the grooves divided into an inner portion and an outer portion, an outer diameter of the inner portion of each of the sheaves is unequal to an outer diameter of the outer portion of each of the sheaves.

2. The conveyor system of claim 1, wherein the directly driven roller is rotationally driven by the drive assembly.

3. The conveyor system of claim 2, wherein the drive assembly driving the directly driven roller is the only drive assembly driving the rollers.

4. The conveyor system of claim 1, wherein the grooves are divided into the inner portion and the outer portion by a partition.

5. The conveyor system of claim 1, wherein a first one of the inner portion and the outer portion of each of the sheaves of the rollers is a drive portion, and wherein a second one of the inner portion and the outer portion of each of the sheaves of the rollers is a driven portion.

6. The conveyor system of claim 5, wherein a difference between the outer diameter of the drive portion of the sheave and the outer diameter of the driven portion of the sheave can be determined with the following formula:

$$\Delta = OD_{Drive} - \left[\left[\frac{S_{Drive} - \left(\frac{S_{Drive} - S_{Driven}}{N}\right)}{S_{Drive}}\right] * OD_{Drive}\right],$$

wherein $OD_{Drive}$ is the outer diameter of the drive portion of one of the sheaves coupled to the directly driven roller, $S_{Drive}$ is a surface speed of the directly driven roller, $S_{Driven}$ is a surface speed of an end one of the slave driven rollers disposed furthest away from the directly driven roller when the outer diameter of one of the sheaves coupled to the end one of the rollers is equal to the outer diameter of the drive portion of the one of the sheaves coupled to the directly driven roller, and N is a number of the rollers in the series of rollers.

7. The conveyor system of claim 1, wherein each of the rollers is disposed at an acute angle with respect to the direction of travel.

8. The conveyor system of claim 1, wherein each of the rollers is disposed substantially perpendicular to the direction of travel.

9. The conveyor system of claim 1, wherein a surface speed of each of the rollers remains substantially constant from the directly driven roller to an end one of the slave driven rollers disposed furthest from the directly driven roller.

10. The conveyor system of claim 8, wherein a surface speed of each of the slave driven rollers is in a range of 0-10 percent of a surface speed of the slave driven roller.

11. The conveyor system of claim 9, wherein the surface speed of each of the directly driven rollers is in a range of 0-3 percent of the surface speed of the slave driven roller.

12. The conveyor system of claim 10, wherein the surface speed of each of the directly driven rollers is in a range of 0-1 percent of the surface speed of the slave driven roller.

13. The conveyor system of claim 1, wherein the slave driven rollers are disposed downstream from the directly driven roller with respect to the direction of travel, and wherein the outer diameter of the outer portion of each of the sheaves is less than the outer diameter of the inner portion of each of the sheaves.

14. The conveyor system of claim 1, wherein the slave driven rollers are disposed upstream from the directly driven roller with respect to the direction of travel, and wherein the outer diameter of the outer portion of each of the sheaves is greater than the outer diameter of the inner portion of each of the sheaves.

15. A method of maintaining a substantially constant surface speed in a conveyor system, comprising the steps of:
providing a series of rollers and a plurality of sheaves, the rollers coupled to a side of a frame and configured to convey a plurality of conveyed articles thereacross, each of the sheaves coupled to a drive end of one of the rollers, each of the sheaves including a plurality of V-shaped grooves formed in an outer surface thereof, the grooves divided into a drive portion and a driven portion, the rollers including a directly driven roller driven by a drive assembly and a plurality of slave driven rollers disposed one of upstream and downstream the directly driven roller with respect to a direction of travel of the conveyor system; and
decreasing an outer diameter of each of the sheaves at the driven portion of each of the sheaves from an outer diameter of each of the sheaves at the drive portion of each of sheaves.

16. The method of claim 15, wherein the step of decreasing the outer diameter of each of the sheaves includes the step of determining a surface speed of the directly driven roller and a surface speed of the end one of the slave driven rollers prior to decreasing the outer diameter of each of the sheaves at the driven portion of the each of the sheaves.

17. The method of claim 16, wherein a difference between the outer diameter of the drive portion of the sheave and the outer diameter of the driven portion of the sheave can be determined with the following formula:

$$\Delta = OD_{Drive} - \left[\left[\frac{S_{Drive} - \left(\frac{S_{Drive} - S_{Driven}}{N}\right)}{S_{Drive}}\right] * OD_{Drive}\right],$$

wherein $OD_{Drive}$ is the outer diameter of the drive portion of one of the sheaves coupled to the directly driven roller, $S_{Drive}$ is a surface speed of the directly driven roller, $S_{Driven}$ is a surface speed of an end one of the slave driven rollers disposed furthest away from the directly driven roller when the outer diameter of one of the sheaves coupled to the end one of the rollers is equal to the outer diameter of the drive portion of the one of the sheaves coupled to the directly driven roller, and N is a number of the rollers in the series of rollers.

18. The method of claim 15, further comprising the step of orienting each of the rollers at an acute angle with respect to the direction of travel or substantially perpendicular the direction of travel.

19. The method of claim 15, further comprising the step of driving each of the rollers, directly or indirectly, with only one drive assembly, wherein a number of the rollers in the series of the rollers is at least nine.

20. A method of maintaining a substantially constant surface speed in a conveyor system, comprising the steps of:
providing a series of rollers and a plurality of sheaves, the rollers coupled to a side of a frame and configured to convey a plurality of conveyed articles thereacross, each of the sheaves coupled to a drive end of one of the rollers, each of the sheaves including a plurality of V-shaped grooves formed in an outer surface thereof, the grooves divided into a drive portion and a driven portion, the rollers including a directly driven roller driven by a drive assembly and a plurality of slave driven rollers disposed one of upstream and downstream the directly driven roller with respect to a direction of travel of the conveyor system;

decreasing an outer diameter of each of the sheaves at the driven portion of each of the sheaves from an outer diameter of each of the sheaves at the drive portion of each of sheaves; and maintaining a substantially constant surface speed across the series of the rollers.

\* \* \* \* \*